United States Patent [19]

Cline et al.

[11] Patent Number: 4,972,465
[45] Date of Patent: Nov. 20, 1990

[54] SWITCHING SYSTEM RELIABILITY

[75] Inventors: William K. Cline, Naperville; Michele M. Janowiak, Woodridge; Ram Nathan, Aurora, all of Ill.

[73] Assignee: AT&T Bell Laboratories, Murray Hill, N.J.

[21] Appl. No.: 356,823

[22] Filed: May 24, 1989

[51] Int. Cl.$^5$ .................. H04M 7/00; H04M 7/14
[52] U.S. Cl. .................. 379/279; 379/221
[58] Field of Search ............ 379/220, 221, 279, 224, 379/225, 201, 229, 231, 234

[56] References Cited

U.S. PATENT DOCUMENTS

| | | |
|---|---|---|
| 3,217,109 | 11/1965 | Abert . |
| 4,583,218 | 4/1986 | Ardon et al. ............... 370/58 |
| 4,755,995 | 7/1988 | Anderson et al. ........... 379/279 X |
| 4,811,388 | 3/1989 | Westerhuf et al. .......... 379/279 X |
| 4,853,957 | 9/1989 | Seeger et al. .............. 379/279 |

OTHER PUBLICATIONS

*Telephony's Dictionary*, 1982, by Graham Langley, p. 212.
*Glossary of Communications*, 1971, by Emerson Smith, p. 437.
G. Zorpette, "Keeping the Phone Lines Open", *IEEE Spectrum*, vol. 26, No. 6, Jun. 1989, pp. 32–36.

*Primary Examiner*—James L. Dwyer
*Attorney, Agent, or Firm*—Kenneth Samples; R. T. Watland

[57] ABSTRACT

A switching system is disclosed in which inter-switch unit trunks interconnect the switch units of a distributed switching system and when the central switch, which normally advances connections between the switch units is unavailable, connections between switch units are advanced by control units of the switch units over the inter-switch unit trunks. The inter-switch unit trunks comprise a connection arrangement which is an alternative to the central switch. In one embodiment, the control unit of a first switch unit detects the unavailability of the central switch to advance connections and in response to a request for connection to destination line or trunk at a second switch unit transmits signaling information on a selected inter-switch unit trunk to the second switch unit. The second switch unit responds to the signaling information by completing a connection from the selected inter-switch unit trunk to the destination. In a second embodiment, an alternative path between an origination and destination switch unit is completed, via a first and second inter-switch unit trunk, which are serially connected by a selected path through an intermediate switch unit. The use of inter-switch unit trunks as an alternative to the central switch avoids possible subscriber isolation during a central office catastrophe, such as a major fire.

13 Claims, 6 Drawing Sheets

16-BIT DATA WORD

SWITCHING SYSTEM RELIABILITY

CROSS-REFERENCE TO RELATED APPLICATION

This application is related to the following applications:
- M. T. Ardon application serial number 356,807 filed May 24, 1989, "Improvement in Switching System Reliability", and
- M. T. Ardon application serial number 356,802 filed May 24, 1989, "Improvement in Switching System Reliability".

The related applications are filed concurrently herewith and are assigned to the assignee of the present invention.

TECHNICAL FIELD

This invention relates to the communication of customer information in a telecommunication switching system and particularly to arrangements for connecting portions of the switching system via trunks when a central stage switch arrangement is unavailable for connections.

BACKGROUND OF THE INVENTION

Local switching systems process originating and terminating calls between customer lines connected to the switching system and trunks to other switching systems. Since most customer lines are connected only to a single local switching system, the availability of telecommunication service to a customer is dependent upon the continued operability of the local switching system.

Such systems are designed and constructed to provide continuing reliable service in the presence of faults. The reliability is sometimes achieved by providing identical duplicates of equipment in the more critical parts of the system. When a failing part is detected, the duplicate is placed in service and the failing part is romoved. With care, the substitution of duplicate for failing parts can occur without the loss of service to customers.

A distributed switching system is one comprised of a plurality of switch units which interface customer lines and trunks on a peripheral side of the unit and which interface a central switch arrangement on the other side of the unit. Calls between customers and/or trunks connected to different switch units are completed through the central switch. A duplicated distributed switching system comprises a plurality of duplicated switching units which are switchably connected by a duplicated pair of central switches. In the presence of faults, a duplicate switching unit is substituted for a failing one and a duplicate central switch is substituted when a central switch fails. This arrangement provides excellent service of systems which undergo normal failures in only one unit of the duplicated pairs.

A disaster, such as a fire in a switching office, may cause catastrophic failures which are not normal and result in the loss of both units of a duplicated pair. With no duplicate to substitute for a failing unit the system may not be able to complete calls. For example, the failure of both units of the central switch will isolate the customers connected to one switch unit from the lines and trunks connected to all of the other switch units of the system. Not only is it impossible to reach a large number of the customers on the same switching system, a customer's access to other switching systems normally reached via trunks at other switching units is also lost. Such isolation of customers is a substantial service limitation which is compounded by the fact that damage repair after a disaster may take an extended period of time.

Although the subscriber isolation problem is raised in the context of disaster which destroys the central switch, the substantial isolation of customers can occur in less catastrophic ways. The switch units of a distributed switching system are connected to the central switch by communication links. The complete failure of the communication links between a switch unit and the central switch can isolate the customers of the switching unit served by those links as much as the complete central switch failure.

A need therefore exists in the art for arrangements which avoid customer isolation by providing switching unit-to-switching unit connections when the central switching arrangement of a distributed switching system, which normally connects switching units, is unavailable for connections from one switch unit to another.

SUMMARY OF THE INVENTION

This need is met in accordance with the invention in which inter-switch unit trunks interconnect the switch units of a distributed switching system and when the central switch, which normally advances connections between switching units is unavailable, connections between switching units are advanced by control units of the switch units over inter-switch unit trunks. The use of inter-switch unit trunks as the alternative to the central switch avoids subscriber isolation during a catastrophe such as a major central office fire.

Advantageously, when an inter-switch unit trunks is used to advance connections it is also used to convery the switch unit-to-switch unit signaling needed to coordinate the establishment of the alternative path. Such signaling includes the information defining a call destination. A switch unit receiving information at a line or trunk defining a call destination at another switch unit forwards the signaling information to the switch unit of the call destination over a selected inter-switch unit trunk to advance the call. The switch unit receiving the original call signaling information connects the line or trunk on which the signaling is received to the inter-switch unit trunk and the destination switch unit, in response to the inter-switch unit trunk signaling, connects the call destination to the inter-switch unit trunk.

When more than two switch units are used to construct the distributed switching system, the number of inter-switch unit trunks required to provide alternative paths can be reduced when a switch unit is used to selectively interconnect inter-switch unit trunks. In an illustrative embodiment, an alternative path is established between a first and second switch unit via two inter-switch unit trunks serially connected by an intervening third switch unit. The first switch unit selects a first inter-switch unit trunk to the intervening switch unit and transmits signaling information thereto. The intervening switch unit selects a second inter-switch unit trunk, in response to the signaling information, and advances the connection to the second (destination) switch unit over the second inter-switch unit trunk. The intervening switch unit then completes a connection between the first inter-switch unit trunk and the second inter-switch unit trunk to interconnect the first and second switch units.

A method for providing alternative paths between the switch units of a distributed switching system is also described in the embodiments. For example, a first switch unit receives call signaling information defining a call destination appearance and makes a determination, based on previously stored status information, that central connection arrangement is unavailable for the connection. The first switch unit identifies, from the call signaling information, a first inter-switch unit trunk to a second switch unit and then call signaling information identifying the call destination is transmitted on the first inter-switch unit trunk to the second switch unit. The latter identifies the call destination from the received signaling information and completes connection between the destination appearance and the inter-switch unit trunk. Alternatively, the second switch unit identifies, from the call signaling information on the first switch unit trunk, a second inter-switch unit trunk to a third switch unit. Signaling information is then transmitted on the second inter-switch unit trunk to advance the connection.

The switch units each comprise a control unit which cooperates with a central controller associated with the central switch to determine the availability of the central switch for advancing connections. A control unit which fails to receive messages from the central control for a predetermined period of time recognizes central switch unavailability and stores central switch unavailability status information in an associated memory. The control unit uses the stored status information to determine when inter-switch unit trunks are to be used to advance connections.

DETAILED DESCRIPTION

Figure 1:
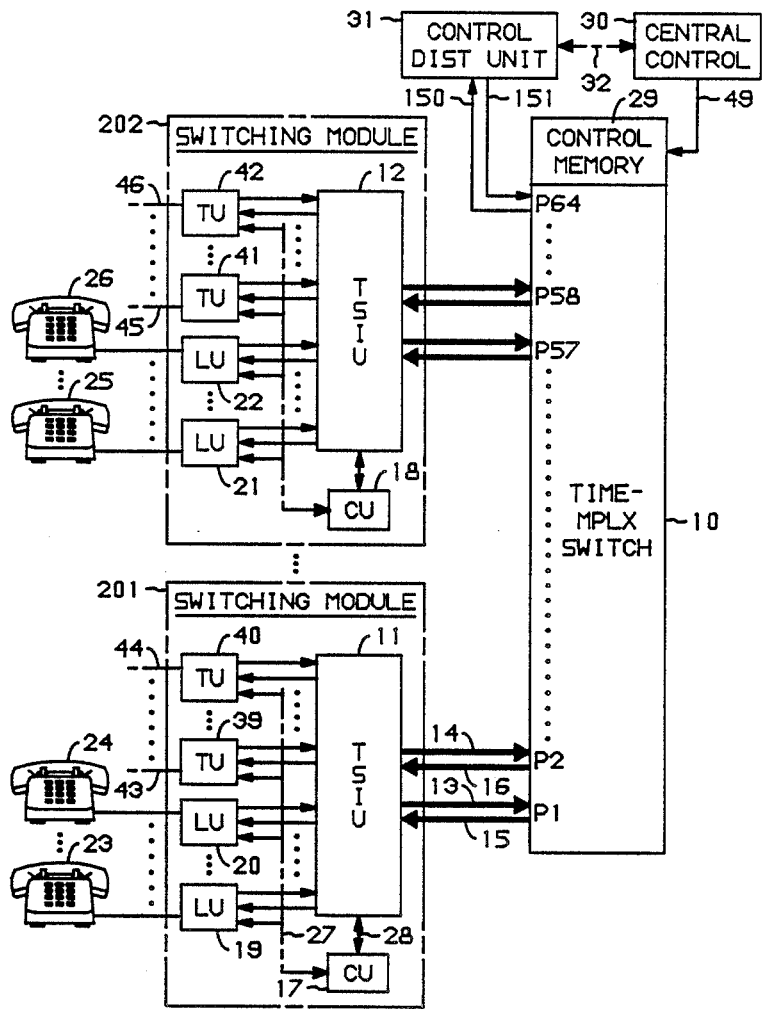
FIG. 1 is a block diagram of a telecommunication switching system.

The time-division switching system of FIG. 1 is used to interconnect subscriber sets such as subscriber sets 23 through 26 and trunks such as trunks 43 through 46 and includes a time-multiplexed switch 10 comprising a time-shared space division switch having 64 input terminal and 64 output terminals. Also included is a plurality of time-slot interchange units of which representative time-slot interchange units 11 and 12 are specifically shown. Each time-slot interchange unit 11 and 12 includes a bidirectional time-slot interchanger and is connected to two input terminals and two output terminals of time-mutiplexed switch 10. In FIG. 1 time-slot interchange unit 11 is connected to two time-multiplexed switch input terminals via time-multiplexed lines 13 and 14 and to two output terminals, via time-multiplexed lines 15 and 16.

In the description which follows, the input and output terminals of time-multiplexed switch 10 are referred to as input/output ternminal pairs. This term is used since the source for data words to an input terminal of a given input/output terminal pair is also the destination for data words from the output terminal of that pair. As shown in FIG. 1, input/output terminal pair P1 is associated with time-multiplexed lines 13 and 15. Each time-multiplexed line 13 through 16 conveys digital information in 125 microsecond frames each comprising 256 time separated channels. Accordingly, each time-slot interchange unit transmits and receives up to 512 channels of digital information during each 125 microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected via individual time-multiplexed lines to a plurality of peripheral units of which line units 19 through 22 and trunk units 39 through 42 are shown in FIG. 1. A time-slot interchange unit, its associated control unit and peripheral units are collectively referred to herein as a switching module which is represented in FIG. 1 as switching modules 201 and 202. Line unit 19 and 20 and trunk unit 39 and 40 are connected to time-slot interchange unit 11 of switching module 201 and line units 21 and 22 and trunks units 41 and 42 are connected to time-slot interchange unit 12 of switching module 202. Each of the line units is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time-multiplexed channels used to transmit the resulting code between the line unit and its associated time-slot interchange unit are determined by the control unit of the associated time-slot interchange unit.

The trunk units, e.g. 39 and 40, perform analogous functions for trunks such as detecting trunk seizures and sending and receiving trunk signaling to and from other systems. The trunks can be either of the analog or digital type. One example of a digital trunk is the T1 carrier system disclosed in the J. H. Green et. al., U.S. Pat. No. 4,059,731, on which 24 separate communication channel are multiplexed.

Figure 3:
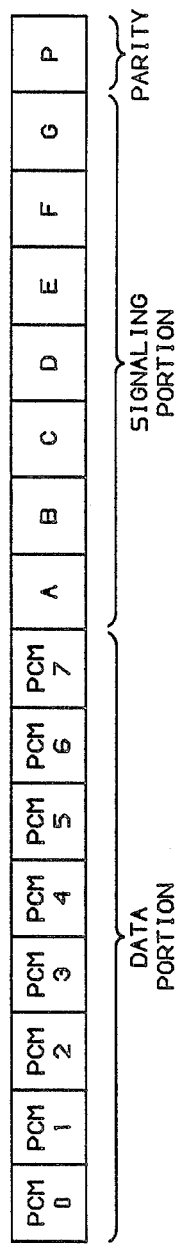
FIG. 3 represents a digital data word.

The relationship of subscriber sets, line/trunk units and time-slot interchange units is substantially the same for each of such groups of interconnected inputs. Accordingly, while the description which follows relates directly to subscriber set 23, line unit 19 and time-slot interchange unit 11 (switching module 201), it shows the relationships for all other groups of such units. Furthermore, an analogous relationship exits between trunks, trunk units and time-slot interchange units. Line unit 19 scans the lines connected to each subscriber set to detect request for service. When such a request is detected, line unit 19 transmits to control unit 17, a message indicating the request and the identity of the requesting subscriber set. This message is transmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time separated channels between line unit 19 and time-slot interchange unit 11 is to be used to trasmit information from subscriber set 23 to time-slot interchange unit 11. Based on this message, line unit 19 encodes the analog information from subscriber set 23 into digital data words and transmits the resulting data words in the assigned channels. FIG. 3 represents the digital data word format used in the present system which format includes an 8-bit data portion and a 7-bit signaling portion. Line unit 19 also transmits in the signaling bit position labeled A (the A-bit) of the assigned channel an indication of the DC state i.e., open circuit/closed circuit of the subscriber loop associated with subscriber set 23.

After a time separated channel between line unit 19 and time-slot interchange unit 11 is assigned to a given subscriber set, control unit 17 detects signaling information from the subscriber set by sampling the information transmitted in he assigned channel. Such sampling operations are performed via a communication path 28. Control unit 17 responds to the signaling information from the subscriber's channel, and to control messages from other control units, e.g., 18, and a central control unit 30, by controlling the time-slot interchange function of the time-slot interchange unit 11.

The trunks, e.g., 43 and 44 are assigned a time-separated channel to the time-slot interchange unit at system initialization and do not require the assignment of a channel when trunk activity begins (origination). The trunk units, e.g., 39 and 40 of the embodiment detect trunk signaling such as trunk seizure and reflect this signaling in the A-bit of the pre-assigned channel. Inband signaling, such as MF tones, is conveyed to the time-slot interchange unit via the PCM data portion of the assigned channel. Control unit 17 detects trunk signaling via the communication path 28 in the same manner that subscriber signaling is detected.

As previously state, each time-multiplexed line between a time-slot interchange unit and the time-multiplexed switch 10 has 256 channels each 125 microsecond frame. These channels are assigned numerical designations from 1 to 256 in sequence as they occur. This sequence of channels recurs so that a given channel will be available every 125 microseconds. The time-slot interchange function takes the data words received from the line and trunk units and places them in channels on the time-multiplexed line between the time-slot interchange units and the time-multiplexed switch 10 under the control of control units 17 and 18.

Time-multiplexed switch 10 operates in recurring frames of time-slots where each 125 microsecond frame comprises 256 time-slots. During each time-slot, time-multiplexed switch 10 is capable of connecting data words received at any of its 64 input terminals to any of its 64 output terminals in accordance with time-slot control information stored in a control memory 29. The configuration pattern of connections through time-multiplexed switch 10 repeats itself every 256 time-slots and each time-slot is assigned a numerical designation in sequence from 1 to 256. Accordingly. during a first time-slot TS 1 the information in a channel (1) on time-multiplexed line 13 may be switched by time-multiplexed switch 10 to an output terminal P64 while during the next time-slot TS 2 the next channel (2) on time-multiplexed line 13 may be switched to an output terminal P57. Time-slot control information is written into control memory 29 by central control 30 which generates this control information from control messages obtained from various control units, e.g., 17 and 18.

Central control 30 and control units 17 and 18 exchange control messages utilizing selected channels called control channels of the time-multiplexed lines, e.g., 13 through 16, between the time-slot interchange units and the time-multiplexed switch 10. Each control message comprises a plurality of control words and each control channel can transmit one control word per frame of 256 time separated channels. The same channel of the two time-multiplexed lines associated with a given input/output terminal pair is predefined to be a control channel. Additionally, a given channel is used as a control channel for only one pair of time-multiplexed lines. For example, if channel 1 is used as a control channel on time-multiplexed line 13 and the associated time-multiplexed line 15, no other time-multiplexed line will use channel 1 as a control channel. During each time-slot having the same numerical designation as a control channel, time-multiplexed switch 10 connects the data word occupying that control channel to output terminal P64 and connects input terminal P64 to the output terminal associated with the above-mentioned control channel.

The following is an example of the embodiment when channel 1 is the control channel for time-multiplexed lines 13 and 15, and channel 2 is the control channel for time-multiplexed lines 14 and 16. During time-slot TS 1 information from control memory 29 defines, among other connections, that the control word in channel 1 of time-multiplexed line 13 is connected to output terminal P64 and that the control word in channel 1 at input terminal P64 is connected to time-multiplexed line 15. Similarly, during time-slot TS 2, information from control memory 29 defines that the control word in channel 2 of time-multiplexed line 14 is connected to output terminal P64 and that the control word in channel 2 at input terminal P64 is connected to time-multiplexed line 16. When operating in this manner, output terminal P64 receives from time-multiplexed switch 10 all control words in a channel having the same numerial designation in which they were transmitted to the time-multiplexed switch. Further, each control channel is connected to receive control words from input terminal P64 during the time-slot having the same numerical designation as their associated control channel. Control words switched to output terminal P64 are transmitted to a control distribution unit 31 which temporarily stores them in a location associated with that control channel. The association of control channels with storage locations in control distribution unit 31 identifies the source of the information stored.

Each control message from a time-slot interchange unit comprises a destination portion and a signaling information portion. The destination portion uniquely defines the expected destination of the signaling portion of the control message. Control distribution unit 31 interprets the destination portion of each control message to determine the proper destination for the control message and retransmits the message to input terminal P64 of time-multiplexed switch 10 in a channel having the same numerical designation as the control channel associated with the destination unit.

When operating as above-described, time-interchange unit 11 transmits control messages to time-slot interchange unit 12 by transmitting control words during its recurring control channel to form a control message having a destination portion identifying time-slot interchange unit 12. Control distribution unit 31 accumulates the control words, interprets the destination portion, and retransmits the message to input terminal P64 during the channel having the same numerical designation as the control channel associated with time-slot interchange unit 12.

A control message can also be transmitted to central control 30 by defining central control 30 in the destination portion of the control message. When this occurs, control distribution unit 31 transmits the message to central control 30 via a communication link 32 rather than returning it to time-multiplexed switch 10. Similarly, a massage may be transmitted from central control 30 to one of the time-slot interchange units by transmitting to the control distribution unit 31 a control message having a destination portion defining the particular time-slot interchange unit. This transmission is also accomplished utilizing communication link 32. The operation of the system shown in FIG. 1 is described in detail in the above-cited Beuscher et. al. U.S. Pat. No. 4,322,843.

The control messages exchanged among control units, e.g., 17 and 18 and the central control 30 are used to advance call completion and to determine the status of the switching system and its parts. Normal call processing involves the receipt of call signaling information from an appearance, e.g., line unit 19 at one switch module, the trasmission of a control message from the receiving switch module to central control 30 defining the incoming call and the transmission of control messages to the receiving and call destination switch modules defining the path through the time-multiplex switch 10 to be used for call completion. The involved switching modules then connect the appropriate lines or trunks to the defined time-multiplex switch 10 path. The exchange of call completion control message coordinates the operation of the involved switching modules and the central control 30 and relies on a decision by the central control for the time-multiplex switch 10 path to be used.

Due to the internative nature of normal call completion, knowledge of the status of the control units and the central 30 is important to each control unit. Each control unit, e.g., 17 and 18 periodically transmits a communication check control message to the central control 30 which replies with a predictable response message to the source control unit. When a control unit does not receive appropriate response messages from central control 30 it assumes a failure of the central control or the time-multiplex switch communication links thereto and changes its status to the stand alone mode. In the stand alone mode, a control unit reacts to input stimuli without assistance from the central control 30 and without paths though the time-multiplex switch 10. Each control unit comprises a memory 57 (FIG. 2) which includes a location that is marked to indicate stand alone status of that control unit.

Figure 2:
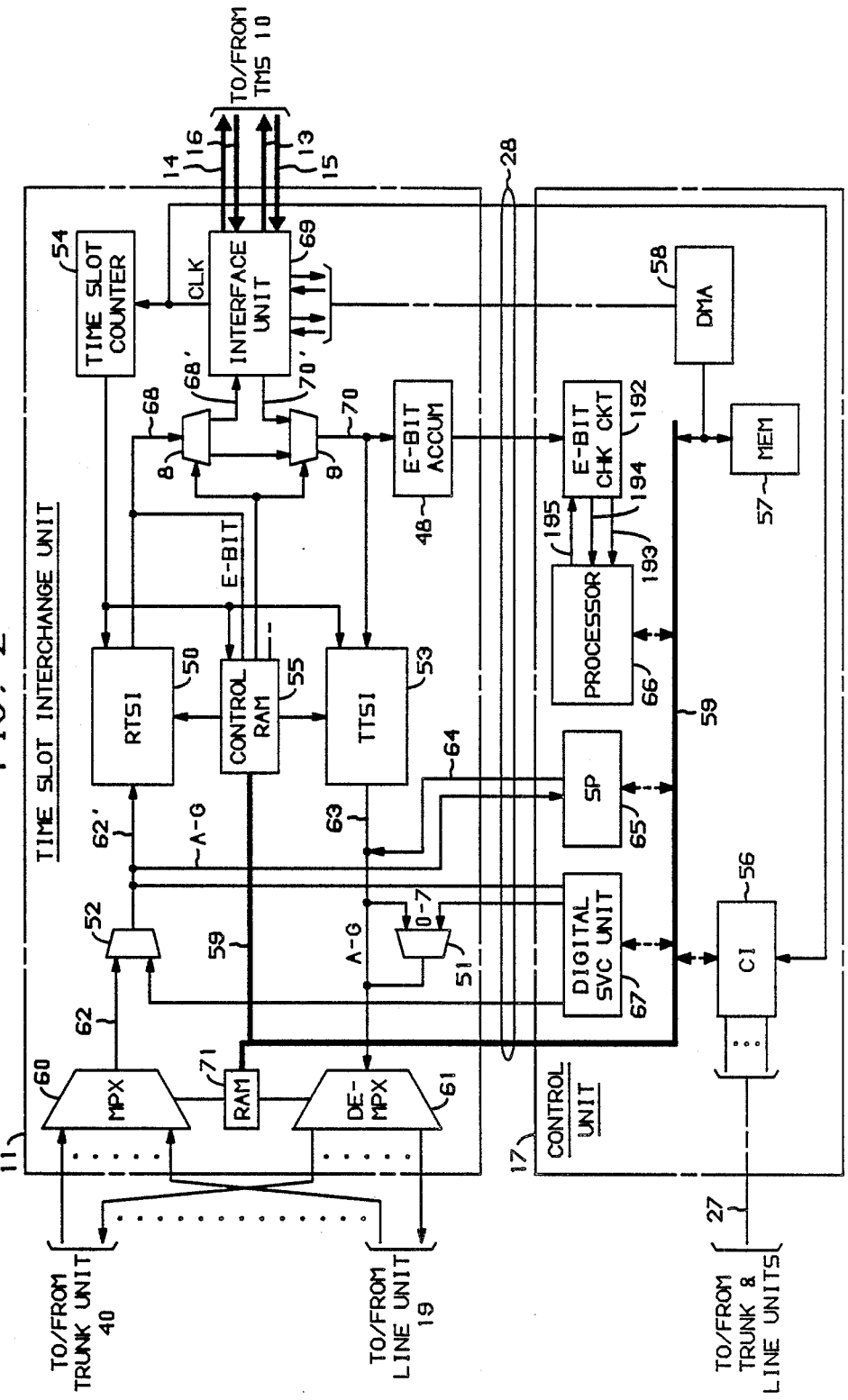
FIG. 2 is block diagram of a time-slot interchange unit employed in FIG. 1.

Central control 30 expects communication check messages from each control unit, e.g., 17 at a predetermined periodic rate. Central control 30 detects when such messages are not properly received, marks the delinquent control unit as unavailable in the central control memory (not shown) and transmits unavailability control messages to the remaining control units. The control units respond to the unavailability notice from central control 30 by marking the unavailable control unit as in the stand by mode in their individual control unit memory 57 (FIG. 2).

Memory 57 (FIG. 2) of each control unit, e.g., 17 stores the program for the control of its associated control unit and data regarding the function of the control unit, its associated time-slot interchange unit and its associated subscribers and trunks. The data stored in memory 57 includes translation tables for translating calling information into information identifying the routing for calls and information defining the status of all switching modules, e.g., 201 and 202. The main processing entity of control unit 17 is a processor 66 which operates in response to instructions data stored in memory 57. Control unit 17 includes a control interface circuit 56 which receives instructions from processor 66 via a bus 59 and in response thereto, communicates with the peripheral units, e.g., line units 19 and 20 and trunk units 39 and 40, via communication path 27. A DMA unit 58 is also included in control unit 17 and is used in conjunction with an interface unit 69 to transmit and receive the control messages on time-multiplexed lines 13 through 16 to and from the time-multiplex switch 10.

Each of the line and trunk units transmits recurring frames of information each comprising 32 channels of 16 bits each. This information is transmitted to a multiplex unit 60 (FIG. 2) within time-slot interchange unit 11. Multiplex unit 60 receives the output signals from the peripheral units which signals are selectively transmitted on an output time-multiplexed line 62 having 512 channels for each 125 microsecond frame. The connection of peripheral unit channels to the channels of time-multiplex line 62 by multiplex unit 60 is controlled by information stored in a control RAM 71 which is cyclically accessed at the time-multiplexed line 62 rate. Control information is written into control RAM 71 by processor 66 at the time of system initialization so that processor 66 is aware of the particular peripheral unit channel occupying each channel on time-multiplex line 62. Similarly, a demultiplex circuit 61 receives 512 channels of 16 bits each on a time-multiplexed line 63 which channels are distributed, in a manner determined by information stored in control RAM 71, to the peripheral unit channels connected to the line and trunk units, e.g., 19 and 40.

The information transmitted in a given channel on time-multiplexed line 62 is conveyed by a gate 52 and a path 62' to a receive time-slot interchanger 50 where it is stored in a memory location uniquely associated with that given channel. The particular memory location of receive time-slot interchange 50 into which a given data word is stored is defined by time-slot designation signals generated by time-slot counter 54. Time-slot counter 54 generates a recurring sequence of 512 time-slot designations at the rate of one time-slot designation per time-slot. The particular time-slot designation generated during the time-slot in which a given data word is received defines the memory location within receive time-slot interchanger 50 which is to store that data word. Data words are also read from receive time-slot interchange 50 at the rate of one data word per time-slot. The memory address of the data word to be read from receive time-slot interchanger 50 during a given time-slot is obtained by reading control RAM 55. Control RAM 55 is read once per time-slot at an address defined by the time-slot designation from time-slot counter 54 and the quantity so read is transmitted to receive time-slot interchanger 50 as the read address for that time-slot.

Data words read from receive time-slot interchanger 50 are transmitted to time-multiplexed switch 10 via a time-multiplexed line 68, a gate 8, a time-multiplexed line 68' and an interface unit 69. Data words from time-multiplexed switch 10 are received by time-slot interchange unit 11 by interface unit 69, and are conveyed via time-multiplexed line 70', a gate 9 and a time-multiplexed line 70 to transmit time-slot interchanger 53. For calls among the line and truck units connected to time-slot interchange unit 11, control RAM 55 effects the operation of gates 8 and 9 such that data words transmitted by receive time-slot interchanger 50 on time-multiplexed line 68 are conveyed via gates 8 and 9 and time-multiplexed line 70 to transmit time-slot interchanger 53.

Transmit time-slot interchanger 53 stores the incoming data words in a location defined by an address form control RAM 55. Data words are read from transmit time-slot interchanger 53 at the address defined by the time-slot counter 54. Data words so read are transmitted on time-multiplexed line 63 for transmission to the peripheral units, e.g., line unit 19. It should be noted that control RAM 55 may be implemented as a number of control memories, each associated with a particular circuit, e.g., transmit time-slot interchanger 53. The particular configuration of control memories is not important to the present description and may vary depending on timing and circuity requirements within the time-slot interchanger unit 11. The general principles of time-slot interchanger as performed by the receive time-slot interchanger 50, the control RAM 55, the time-slot counter 54 and the transmit time-slot interchanger 53 are well known in the art and not described in greater detail herein. One arrangement for reading and writing data words in time-slot memories is described in detail in U.S. Pat. No. 4,035,584, J. W. Lurtz.

Line and trunk scanning and signaling are provided by the control unit 17 which includes a signal processor 65 and a digital service unit 67. Signal processor 65 reduces the real time load requirement of processor 66 by receiving and analyzing the signaling portion (bits A through G, FIG. 3) of each data word received on line 62' from line and trunk units and any transmitting signaling bits to the line and trunk units. Processor 66 reads the status of the each incoming channel on time-multiplex line 62' from signal processor 65. This status, as attributed by processor 66 to the line or trunk connected to a channel, shows line or trunk status for call processing purposes. Signal processor 65 also transmits signaling information. Signaling bits are passed from the processor 66 to signal processor 65 with indications of their destination channel on time-multiplex line 63. Signal processor 65 then controls the signaling bits A through G of the destination channels via the path 64 to transmit signaling information to the line and trunk units. Digital service unit 67 receives the PCM data portion of each data word received by line 62' from the line and trunk units to detect PCM tone signals from subscribers and trunks. The processor 66 periodically reads the received signaling information from the digital services unit 67 to detect line and trunk signaling. Digital unit 67 is also used to transmit tones and signals in PCM format via a gate 51 to subscribers and trunks and via a gate 52 to time-multiplex switch 10. Definitions of the tones and signals are sent from processor 66 to digital service unit 67 which places signals in appropriate channels.

The primary mode of control information exchange comprises the transmission of control messages from a source time-slot interchange unit through the time-multiplexed switch 10 and the control distribution unit 31 and back to the destination time-slot interchange unit. A secondary mode of communication is also used whereby control information with regard to a given call is transmitted from the source time-slot interchange unit to the destination time-slot interchanger unit via the time-multiplexed switch 10 utilizing the time-slot assigned for that call. The E-bit position of the data word in an active call time-slot is used for the secondary mode communication. However, it can be seen that any or all of the signaling bits could used in this secondary communication mode. The E-bit serves the dual purpose of signal acknowledgement during the establishment of a path through the time-multiplexed switch 10 and continuing path continuity check during the connection. The operation of E-bit accumulator 48 and E-bit check circuit 192, which communicates with processor 66 via conductors 193, 194, and 195 in performing these dual purposes is described in detail in the above-cited Beuscher, et. al., U.S. Pat. No. 4,322,843.

In the system described above, with regard to normal switching system operation, a switching module collects signaling information from subscriber sets, e.g., 23 and/or trunks, e.g., 44 and in cooperation with the central control 30 and other switching modules completes communication paths to the other subscriber sets and trunks. When the call signaling information received by one switching module defines a subscriber set or trunk connected to another switching module, a path through the time-multiplex switch 10 is located and established by the central control 30 to complete the connection. When received call signaling information defines a line or trunk on the same switching module a communication path is completed within the switching module via gate 8 and 9 (FIG. 2).

The above-described system provides telecommunication services among peripheral appearances (lines and trunks) connected to the same switching module and provides service among lines and trunk appearances on different switch modules via connections through time-multiplex switch 10. Should a switch module lose contact with the time-multiplex switch 10 by a failure of its time-multiplexed links, e.g., 13 through 16, a time-mutiplex switch 10 failure, a control distribution unit 31 failure or a central control 30 failure, connection can be provided only among the lines and trunks connected to the same switch module. In some situations this limited service is acceptable, but in most situations the inability to connect lines and trunks on different switch modules is a severe service limitation.

Figure 4:
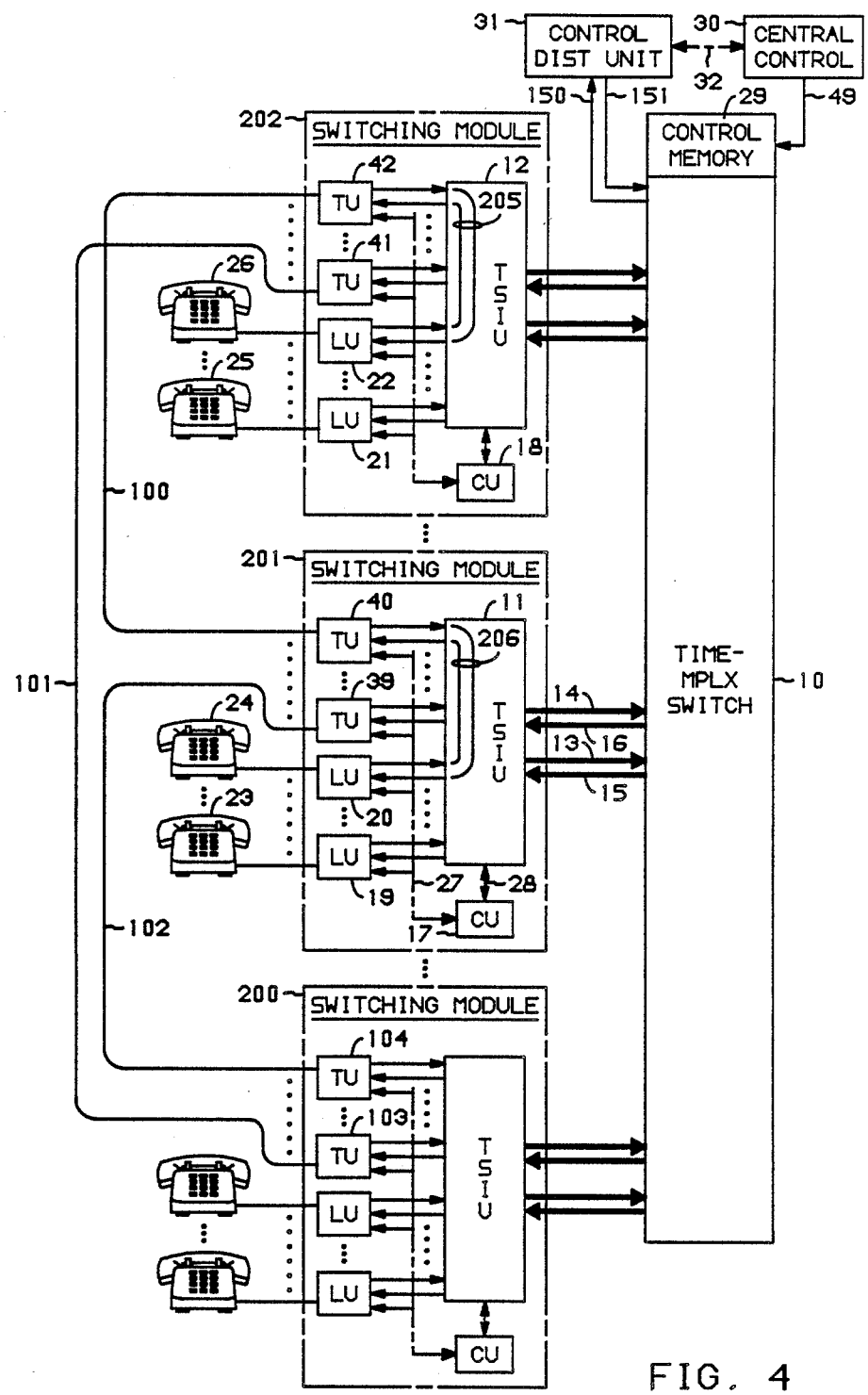
FIGS. 4 and 5 represent arrangements for interconnecting switch modules using inter-switch module trunks.
Figure 5:
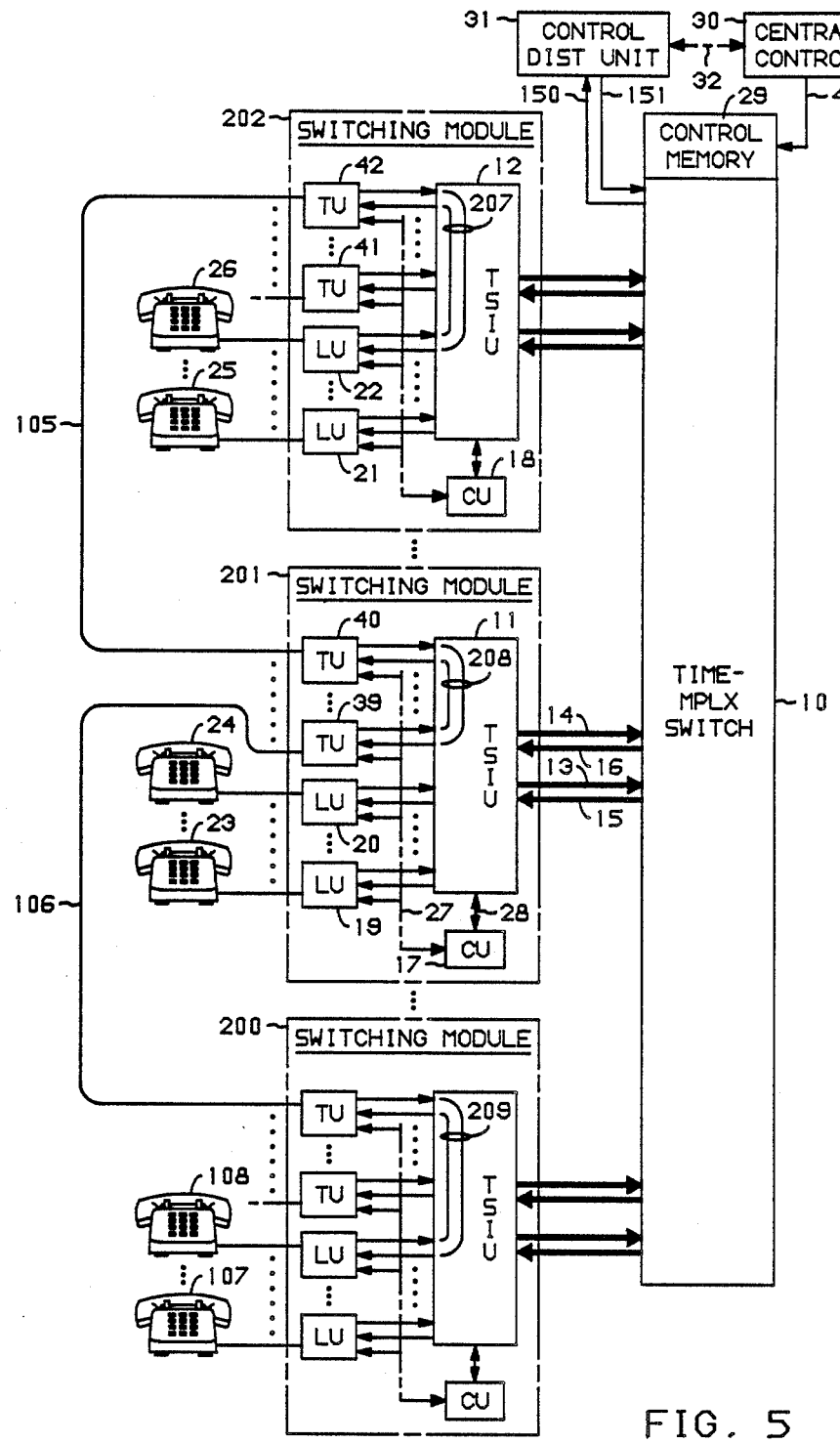
Figure 6:
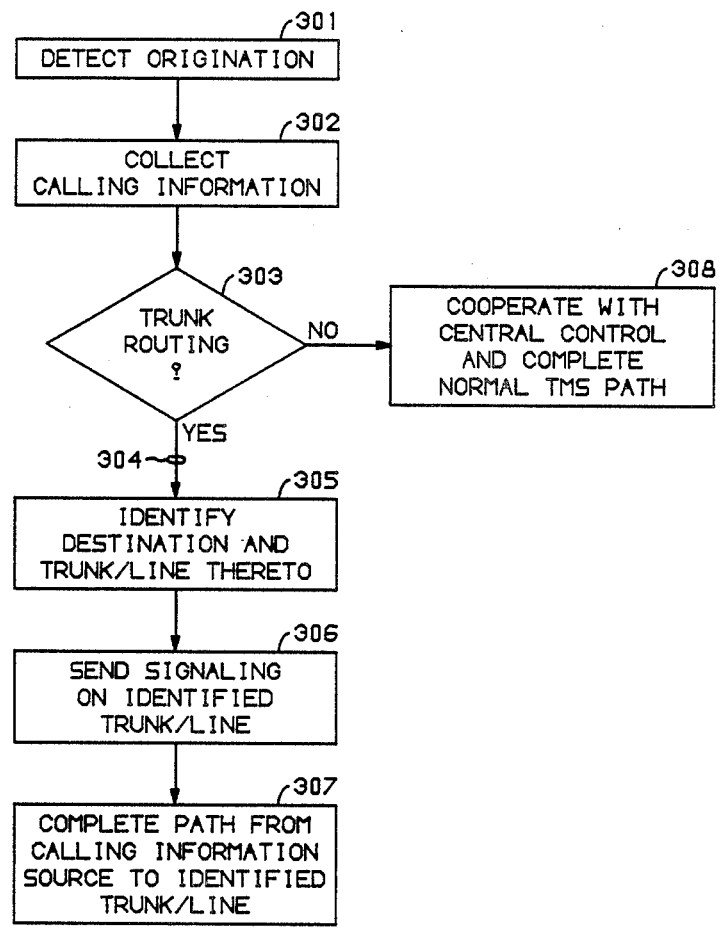
FIG. 6 is a flow diagram of a call completion process.

FIGS. 4 and 5 represent improved systems and new methods of operation which advantageously use trunks connected to the peripheral side of switch units to provide alternative paths between switching modules when the normal paths through time-multiplex switch 10 are unavailable. FIG. 6 represents a new call processing routine which is performed to take advantage of the arrangements of FIGS. 4 and 5.

FIG. 4 represents a time division switching system of the type. disclosed in FIG. 1 and components having the same reference numeral as like components in FIG. 1 are the same. The system shown in FIG. 4 comprises three representative switch modules 200 through 202. These switch modules are interconnected by bidirectional inter-switching module trunks 100, 101 and 102.

Trunk 100 connects trunk unit 42 of switch module 202 to trunk unit 40 of switch module 201, trunk 101 connects trunk unit 41 of switch module 202 to trunk unit 103 of switch module 200 and trunk 102 connects trunk unit 39 of switch module 201 to trunk unit 104 of switch module 200.

As previously discussed, each switching module stores in its memory 57 an indication of its status and that of all other switching modules regarding stand alone operation. A given switching module uses inter-switching module trunks, e.g., 100 through 102 for routing when it is in the stand alone mode or when it has been notified by the central control 30 that the destination switching module for an incoming call is in the stand alone mode. For the following example, it is assumed that time-multiplex switch 10 has failed and is incapable of providing inter-switching module connections. The failure of the control message communication link provided by time-multiplex switch 10 is detected by the switching module 200 through 202, which begin the stand alone mode of operation. In the stand alone mode, the switching module control units, e.g. 18 no longer send messages to other control units or the central control 30 and take on the responsibility for seeking the destination for each call received at that switching module. In furtherance of this mode of operation, each control unit, e.g., 18 maintains a translation table which identifies the switching module associated with each subscriber set directory number of the switching system and the identities of one or inter-switching module trunks to be used to connect to other subscriber sets.

In the description of FIGS. 1 through 3 a normal call processing routine for finding connections between switching modules through the time-multiplex switch 10 was followed. When no time-multiplex switch connection was available, a requested call between switching modules would fail. FIG. 6 is a flow diagram representing a new call processing routine which is employed to connect switching modules via inter-switch unit trunks connected among the peripheral trunk units of the switching modules. The switching system of FIG. 4 operates in accordance with the call processing routine of FIG. 6 which is described in terms of an exemplary call from subscriber set 26 of switching module 202 to subscriber set 24 of switching module 201.

Control unit 18 (block 301, FIG. 6), by means described with regard to FIGS. 1 through 3, detects when subscriber set 26 goes off-hook and begins to collect the dialed digits. In accordance with the present example, the dialed digits define subscriber set 24 of switch module 201. When all digits are collected (block 302) the call processing routine proceeds to block 303 where the switching module status is checked and a decision is made to use either normal time-multiplex switch 10 routing or the altenative inter-switch module trunk routing. The status information stored in memory 57 (FIG. 2) is read to make this decision. When, as in the present example, a switch module is in the stand alone mode, normal pathing through the time-mutiplex switch 10 is not available and the routing process continues from block 303 via path 304 to block 305. In block 305 the control unit 18 consults its translation table in memory 57 (FIG. 2) and determines that trunk 100 is available to switching module 201 which is connected to the dialed subscriber set 24. Accordingly, control unit 18 seizes trunk 100 and proceeds to send a representation of the dialed digits on trunk 100 in response to the appropriate acknowledgement signals from switching module 201 ( block 306). Switching module 202 finally completes path 205 between subscriber set 26 and trunk 100 (block 307).

With some overlap of operation with switch module 202, switch module 201 starts a call processing program as shown in FIG. 6 in response to the seizure of inter-switch module trunk 100 by switching module 202. Switching module 201 completes the origination with an acknowledgement signal ( block 301) and collects the digits from trunk 100 in block 302. The call processing routine in switching module 201 proceeds through block 303 to block 305 where control unit 17 consults its translation table using digits received from trunk 100 and determines that they represent subscriber set 24. Switching module 201 then signals subscriber set 24 (block 306) and completes the path 206 between line unit 20 and trunk unit 40 (block 307) upon answer at subscriber set 24. Subscriber set 24 is then connected to subscriber set 26 via the path provided by path 205 through time slot interchange unit 12, the trunk 100 and the path 206 through time-slot interchange unit 11. This path is an alternative to the unavailable (in the present example) path through time-multiplex switch 10 which would have been established in block 308 (FIG. 6) had trunk routing not been selected in block 303.

For complete connectability, the arrangement shown in FIG. 4 includes at least one trunk between each pair of switch modules. This results in $$\frac{N(N-1)}{2}$$

interconnecting trunks, where N represents the number of switching modules. As the number of switching modules increases, the number of interconnecting trunks becomes so large that a completely interconnected system of the type shown in FIG. 4 may not be desirable.

FIG. 5 shows an embodiment in which the number of interconnecting trunks is substantially reduced from $$\frac{N(N-1)}{2}.$$

In FIG. 5, switching module 201 is used as an inter-module trunk switch and is connected to switching module 202 via a trunk 105 and to switching module 200 via trunk 106. The intermodule trunk switch provides selective trunk connection between switching modules, e.g., 200 and 202.

In the example which follows, all switching modules 200 through 202 are in the stand alone mode and subscriber set 26 of switching module 202 desires connection to subscriber set 108 of switching module 200. All of the switching modules 200 through 202 perform call processing in accordance with the flow diagram of FIG. 6. Switching module 202 detects the origination by subscriber set 26 and determines from the dialed digits that trunk 105 can be used to advance a connection toward subscriber set 108. Switching module 202 then completes a path 207 between subscriber set 26 and trunk 105 and transmits the dialed number on inter-switch module trunk 105. Switching module 201 receives the digits on trunk 105 and determines from its translation table that subscriber set 108 can be reached on trunk 106 to switching module 200. Switching module 201 then completes path 208 between trunk 105 and trunk 106 and sends the number originally dialed by subscriber set 26 on trunk 106. Switching module 200 receives the number on trunk 106 and by use of its translation table identifies subscriber set 108 as the call destination. Switching module 200 signals subscriber set 108 and completes a path 209 between subscriber set 108 and trunk 106, when the subscriber at subscriber set 108 answers. A path consisting of path 209, trunk 106, path 208, trunk 105 and path 207 exists between called subscriber 108 and calling subscriber 26.

In the preceding examples, all of the switching modules are in the stand alone mode. It is possible that some, but less than all, of the switching modules required for connection are in stand alone mode and other switching modules still employ connection path through the time-multiplex switch 10. When, for example, switching module 202 is in the stand alone mode and desires a connection to a subscriber 108 on switching module 200, a first path will be established to switching module 201 using the path discussed with regard to FIG. 5 consisting of path 207 and trunk 105. Switching module 201 receives the digits on trunk 105, and since it is not in the stand alone mode, completes a path to switching module 200 via the time-multiplex switch 10 in the normal mode. That is, module 201 communicates with central control 30 and cooperates therewith to complete a path to switching mode 200 via the time-multiplex switch 10. Switching module 200 then finishes the path from time-multiplex switch 10 to subscriber set 108.

When a called subscriber is connected to a switching module which is in the stand alone mode and the calling switching module is not in the stand alone mode, trunk routing is employed by the calling switching module. In this situation, the central control 30 continues to notify all switching modules of those switching modules which are in the stand alone mode so that proper routing choices are made in block 303 of FIG. 6.

We claim:

1. A telecommunications switching system comprising:
    a plurality of switch units, each comprising a plurality of line appearances and a plurality of trunk appearances, for selectively connecting said appearances to a central connection means;
    said central connection means connected to said plurality of switch units and cooperative with said switch units for selectively interconnecting said switch units to advance connections between ones of said appearances on different ones of said switch units; and
    an alternative arrangement for connecting a first one of said appearances on a first one of said switch units to a second one of said appearances on a second one of said switch units comprising:
    means for connecting a predetermined one of said trunk appearances on said first switch unit to a predetermined one of said trunk appearances on said second switch unit; and
    control means for advancing a connection between said first and second appearances via said connecting means when said central connection means is unavailable to interconnect said first and second switch units.

2. The system of claim 1 wherein said control means comprises:
    means for receiving at said first appearance, call signaling information defining said second appearance; and
    means, responsive to said call signaling information, for transmitting on said connecting means, trunk signaling information defining said second appearance.

3. The system of claim 2 wherein said second switch unit comprises means responsive to said trunk signaling information received on said connecting means for connecting said second appearance to said connecting means.

4. The system of claim 3 wherein said first switch unit comprises means responsive to said call signaling information for connecting said first appearance to said connecting means.

5. A telecommunications switching system comprising:
    a plurality of switch units, each comprising a plurality of line appearances and a plurality of trunk appearances, for selectively connecting said appearances to a central connection means;
    said central connection means connected to said plurality of switch units and cooperative with said switch units for selectively interconnecting said switch units to advance connections between ones of said appearances on different ones of said switch units, and
    an alternative arrangement for connecting a first appearance on a first one of said switch units to a second appearance on a second one of said switch units comprising:
    inter-switch unit trunk means connecting one of said trunk appearances on said first switch unit to one of said trunk appearances on said second switch unit;
    means for determining that said alternative arrangement is to be used for connections between said first and said second switch units;
    first connection means in said first switch unit responsive to said determining means and to call signaling information defining said second appearance, received by said first switch unit for connecting said first appearance to said inter-switch unit trunk means; and
    second connection means in said second switch unit for connecting said inter-switch unit trunk means to said second appearance.

6. The switching system of claim 5 comprising:
    means in said first switch unit for transmitting trunk signaling information defining said second appearance, on said inter-switch unit trunk means; and
    said second connection means comprises responsive to said trunk signaling information received on said inter-switch unit trunk means for connecting said inter-switch unit trunk means to said second appearance.

7. A telecommunications switching system comprising:
    a plurality of switch units each comprising a plurality of line appearances and a plurality of trunk appearances for selectively connecting said appearances to a central connection means;
    said central connection means connected to said plurality of switch units and cooperative with said switch unit for selectively interconnecting said switch units to advance connections between ones of said appearances on different ones of said switch units; and
    an alternative arrangements for selectively interconnecting said switch units to advance connections between a first appearance on a first one of said switch units and a second appearance on a second one of said switch units comprising:

first inter-switch unit trunk means for connecting one of said trunk appearances on said first switch unit to one of said trunk appearances on a third one of said switch units;

second inter-switch unit trunk means for connecting another of said trunk appearances on said third switch unit to a trunk appearance on said second switch unit; and means in said third switch unit for connecting said one appearance on said third switch unit to said another appearance on said third switch unit.

8. The system of claim 7 comprising means in said first switch unit for connecting said first appearance to said first inter-switch unit trunk means; and means in said second switch unit for connecting said second appearance to said second inter-switch unit trunk means.

9. A telecommunications switching system comprising:

a plurality of switch units each comprising a plurality of line appearances and a plurality of trunk appearances for selectively connecting said appearances to a central connection means;

said central connection means connected to said plurality of switch units and cooperative with said switch units for selectively interconnecting said switch units to advance connections between ones of said appearances on different ones of said switch units:

means for receiving first call signaling information at a first appearance on a first one of said switch units, said first call signaling information defining a second appearance on a second of said switch units; and an alternative arrangement for connecting a first appearance on a first one of said switch units with a second appearance on a second one of said switch units comprising:

first inter-switch unit trunk means for connecting one of said trunk appearances on said first switch unit to one of said trunk appearances on a third one of said switch units;

second inter-switch unit trunk means for connecting another of said trunk appearances on said third switch unit to a trunk appearance on said second switch unit; and connection means in said first switch unit responsive to said first call signaling information for connecting said first appearance to said first inter-switch unit trunk means;

signaling means, in said first switch unit, for transmitting on said first inter-switch unit trunk means second call signaling information defining said second appearance;

connection means in said third switch unit responsive to said second call signaling information for connecting said first and said second inter-switch unit trunk means;

signaling means in said third switch unit for transmitting on said second inter-switch unit trunk means third call signaling information identifying said second appearance; and means in said second switch unit for connecting said second inter-switch unit trunk to said second appearance.

10. In a telecommunication switching system comprising:

a plurality of switch units, each comprising a plurality of line appearances and a plurality of trunk appearances, for selectively connecting said appearances to a central connection means;

said central connection means connected to said plurality of switch unit and cooperative therewith for selectively interconnecting said switch units to advance connections between ones of said appearances on different ones of said switch units; and a plurality of inter-switch unit trunk means for interconnecting pairs of said trunk appearances on different ones of said switch units, a method comprising:

receiving at a first appearance of a first switch unit, call signaling information specifying a call destination;

determining that said central connection means is unavailable to advance a connection to said call destination;

responsive to said determining step, identifying from said call signaling information, a first one of said inter-switch unit trunk means connecting said first switch unit to a second switch unit, when said central connection means is unavailable; and transmitting on said first one of said inter-switch unit trunk means first trunk signaling information specifying said call destination.

11. The method of claim 10 comprising:

identifying from said first trunk signaling information a second appearance on said second switch unit;

connecting, at said second switch unit, said identified second appearance to said first inter-switch unit trunk means; and connecting, at said first switch unit, said first inter-switch unit trunk means to said first appearance.

12. The method of claim 10 comprising:

identifying from said first trunk signaling information, a second one of said inter-switch unit trunk means connecting said second switch unit to a third switch unit; and transmitting second trunk signaling information specifying said call destination, on said second one of said inter-switch unit trunk means.

13. The method of claim 12 comprising:

identifying from said second trunk signaling information, a second appearance on said third switch unit, connecting, in said third switch unit, said second appearance to said second inter-switch unit trunk means, connecting in said second switch unit, said first inter-switch unit trunk means to said second inter-switch unit trunk means, and connecting in said first switch unit, said first inter-switch unit trunk means to said first appearance.

* * * * *

UNITED STATES PATENT AND TRADEMARK OFFICE
CERTIFICATE OF CORRECTION

PATENT NO.   : 4,972,465
DATED        : November 20, 1990
INVENTOR(S)  : William K. Cline, Michele M. Janowiak, Ram Nathan It is certified that error appears in the above-identified patent and that said Letters Patent is hereby corrected as shown below:

IN THE CLAIMS

Column 14, line 49, claim 6, "comprises responsive" should be
  "comprises means responsive";
Column 14, line 62, claim 7, "switch unit" should be "switch units";
Column 14, line 66, claim 7, "an alternative arrangements" should be
  "an alternative arrangement";
Column 16, line 13, claim 10, "switch unit" should be "switch units".

Signed and Sealed this

Twenty-second Day of September, 1992

Attest:

DOUGLAS B. COMER

Attesting Officer       Acting Commissioner of Patents and Trademarks